(12) United States Patent
Byun et al.

(10) Patent No.: US 9,537,135 B2
(45) Date of Patent: Jan. 3, 2017

(54) TERMINAL OF RECHARGEABLE BATTERY AND METHOD OF MANUFACTURING THE SAME

(75) Inventors: Sangwon Byun, Yongin-si (KR);
Youngkee Shin, Yongin-si (KR);
Jinhwan Chang, Yongin-si (KR);
Myungjin Jeong, Yongin-si (KR);
Sangshin Choi, Yongin-si (KR);
Jeongwon Oh, Yongin-si (KR);
Sooseok Choi, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 454 days.

(21) Appl. No.: 12/986,065

(22) Filed: Jan. 6, 2011

(65) Prior Publication Data
US 2012/0021278 A1 Jan. 26, 2012

Related U.S. Application Data

(60) Provisional application No. 61/366,396, filed on Jul. 21, 2010.

(51) Int. Cl.
*H01M 2/02* (2006.01)
*H01M 10/04* (2006.01)
(Continued)

(52) U.S. Cl.
CPC .......... *H01M 2/307* (2013.01); *H01M 2/0473* (2013.01); *H01M 2/02* (2013.01);
(Continued)

(58) Field of Classification Search
None
See application file for complete search history.

(56) References Cited

U.S. PATENT DOCUMENTS 6,156,452 A * 12/2000 Kozuki et al. ................. 429/211
6,312,852 B1 * 11/2001 Wagner ................... H01M 2/06
429/163

(Continued)

FOREIGN PATENT DOCUMENTS

CN 1241303 A 1/2000
CN 101562238 * 10/2009 .............. H01M 2/04
(Continued)

OTHER PUBLICATIONS

European Search Report dated May 6, 2011 for the European patent application 11152862.6, noting the listed references in this IDS.
(Continued)

*Primary Examiner* — Barbara Gilliam
*Assistant Examiner* — Angela Martin
(74) *Attorney, Agent, or Firm* — Lewis Roca Rothgerber Christie LLP

(57) ABSTRACT

A rechargeable battery including a case; a cap plate on the case; a terminal post protruding from the cap plate; a terminal plate coupled to the terminal post, wherein the terminal plate includes a body having an opening; and a conductor within the opening and coupled to the body, wherein the conductor substantially surrounds a circumference of the terminal post.

14 Claims, 9 Drawing Sheets

(51) Int. Cl.
   *H01M 10/052* (2010.01)
   *H01M 2/30* (2006.01)
   *H01M 2/04* (2006.01)
   *H01M 2/10* (2006.01)

(52) U.S. Cl.
   CPC .......... *H01M 2/1016* (2013.01); *H01M 10/04* (2013.01); *H01M 10/052* (2013.01); *Y02T 10/7011* (2013.01)

(56) References Cited

U.S. PATENT DOCUMENTS

| | | | | |
|---|---|---|---|---|
| 2001/0049054 | A1* | 12/2001 | Enomoto | H01M 2/04 429/158 |
| 2005/0106455 | A1* | 5/2005 | Yoshida | H01M 2/30 429/178 |
| 2006/0115727 | A1* | 6/2006 | Kim | H01M 2/08 429/181 |
| 2006/0159989 | A1* | 7/2006 | Bouffard | 429/164 |
| 2009/0186269 | A1 | 7/2009 | Kim et al. | |
| 2010/0040943 | A1 | 2/2010 | Kim | |
| 2011/0244309 | A1* | 10/2011 | Byun | H01M 2/043 429/158 |
| 2011/0287300 | A1* | 11/2011 | Byun | H01M 2/202 429/158 |

FOREIGN PATENT DOCUMENTS

| | | | | |
|---|---|---|---|---|
| CN | 101651229 | | 2/2010 | |
| JP | 08-162092 | | 6/1996 | |
| JP | 09-320630 | | 12/1997 | |
| JP | 2000-048803 | * | 2/2000 | ............ H01M 2/34 |
| JP | 2001-357834 | | 12/2001 | |
| JP | 2002-170595 | | 6/2002 | |
| JP | 2002-216716 | A | 8/2002 | |
| JP | 2002-358945 | A | 12/2002 | |
| JP | 2011-210482 | A | 10/2011 | |
| KR | 10-2003-0034429 | * | 5/2003 | |
| KR | 10-2007-0056428 | | 6/2007 | |
| KR | 10-2010-0021192 | | 2/2010 | |
| KR | 102010021192 | * | 2/2010 | ............ H01M 10/36 |

OTHER PUBLICATIONS

Patent Abstract of Japan and English machine translation of Japanese Publication 09-320630 listed above, 3 pages.
Patent Abstracts of Japan and Machine English translation of JP 08-162092.
Patent Abstracts of Japan and Machine English translation of JP 2000-048803.
Patent Abstracts of Japan and Machine English translation of JP 2001-357834.
Patent Abstracts of Japan and Machine English translation of JP 2002-170595.
KIPO Notice of Allowance dated Dec. 20, 2012 in KR 10-2011-0008862, 5 pages.
SIPO Office action dated Aug. 14, 2013, for Chinese Patent Application No. 201110078591 and English Translation, 16 pgs.
Patent Abstracts of Japan and English Machine Translation of JP 2002-216716 A, 37 pages.
Patent Abstracts of Japan and English Machine Translation of JP 2002-358945 A, 11 pages.
Japanese Office Action dated Mar. 26, 2013, for Application No. 2011-069890, 2 pages.
SIPO Office action dated Mar. 11, 2014, for corresponding Chinese Patent application 201110078591.0, (7 pages).

* cited by examiner

TERMINAL OF RECHARGEABLE BATTERY AND METHOD OF MANUFACTURING THE SAME

CROSS-REFERENCE TO RELATED APPLICATIONS

This application claims priority to and the benefit of U.S. Provisional Application 61/366,396 filed Jul. 21, 2010, in the United States Patent Office, the entire content of which is incorporated herein by reference.

BACKGROUND

1. Field

Embodiments relate to a terminal of a rechargeable battery and a method of manufacturing the same.

2. Related Art

Generally, rechargeable batteries are capable of being charged and discharged unlike primary batteries that are not capable of being recharged. In the case of a low capacity battery in which one battery cell is packaged into a pack shape, the low capacity battery may be used as a power source for various portable small electronic devices such as mobile phones, camcorders, etc. In case of a high capacity battery in which several tens of battery cells are connected in serial or in parallel, the high capacity battery may be used as a power source for driving motors such as electric scooters, hybrid electric vehicles, electric vehicles, etc.

A rechargeable battery may be manufactured in various shapes such as a cylindrical shape and a prismatic shape. A rechargeable battery typically includes an electrode assembly including a positive electrode plate, a negative electrode plate, and a separator between the positive and negative electrode plates, a case in which the electrode assembly together with electrolyte is housed, and a cap plate mounted on the case. Here, a positive terminal and a negative terminal are connected to the electrode assembly. Also, the positive and negative terminals are exposed and protrude to the outside through the cap plate.

SUMMARY

An aspect of the present invention provides a terminal of a rechargeable battery which is formed of heterogeneous or different materials and a method of manufacturing the same.

According to at least one of embodiments, a rechargeable battery is provided including a case; a cap plate on the case; a terminal post protruding from the cap plate; a terminal plate coupled to the terminal post, wherein the terminal plate includes a body having an opening; and a conductor within the opening and coupled to the body, wherein the conductor substantially surrounds a circumference of the terminal post.

In one embodiment, the conductor and the terminal post are made from the same material, for example copper or a copper alloy. Additionally, in one embodiment, the conductor and the terminal plate are made from different materials. For example, the terminal plate may be made from aluminum or an aluminum alloy.

The secondary battery may also include an insulating member contacting the terminal post, the conductor and the terminal plate. In embodiments, one of the terminal plate or the insulating member has a groove configured to receive a protrusion on the other of the insulating member or the terminal plate. Further, one of the cap plate or the insulating member may have a groove adapted to receive a protrusion on the other of the insulating member or the cap plate. A side wall of the terminal plate that contacts the conductor may have a roughened texture.

In one embodiment, the conductor and the first terminal plate are welded together, for example, diffusion welded together. Additionally, the conductor and the terminal post may be welded together, for example, laser welded together. In one embodiment, a boundary region of the terminal post and the conductor are welded to each other.

In one embodiment, the conductor includes a plated conductive material and a thickness of the conductor may be more than about 1 mm.

In the terminal of the rechargeable battery and the method of manufacturing the same according to an embodiment, a conductor formed of copper or copper alloy is provided on a terminal plate formed of aluminum or aluminum alloy. Also, a terminal post formed of copper or copper alloy is coupled to the conductor formed of copper or copper alloy. Thus, the terminal post formed of copper or copper alloy and the conductor formed of copper or copper alloy may be easily welded to each other.

The terminal of the rechargeable battery according to an embodiment is adequate for the negative terminal. That is, the negative electrode plate of the electrode assembly is formed of copper or copper alloy, and also the negative electrode collector welded to the negative electrode plate is formed of copper or copper alloy. Furthermore, the negative electrode terminal post coupled to the negative electrode collector is formed of copper or copper alloy. Since the bus bar (a member that connects a plurality of rechargeable batteries to each other in series or in parallel) coupled to the negative terminal plate is generally formed of aluminum or aluminum alloy, the terminal plate is formed of aluminum or aluminum alloy to easily weld the terminal plate thereto.

Thus, it is difficult to weld the negative terminal post formed of copper or copper alloy to the negative terminal plate formed of aluminum or aluminum alloy.

However, according to the embodiment, since the conductor formed of copper or copper alloy is provided on the negative terminal plate formed of aluminum or aluminum alloy, the negative terminal post formed of copper or copper alloy and the conductor formed of copper or copper alloy may be easily welded to each other.

In addition, since the conductor is formed using the plating process or the diffusion-welding process, the coupling force between the conductor and the terminal plate may be improved. That is, the conductor is not separated or exfoliated from the terminal plate. Also, when a surface of the terminal plate is roughened and the conductor is formed on the roughened surface through the plating process, the coupling force between the terminal plate and the conductor may be further improved.

Furthermore, since the conductor has a thickness of about 1 mm or more, the sufficient welding region may be secured between the terminal post and the conductor. Therefore, the welding strength between the terminal post and the conductor may be further improved.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Figure 1:
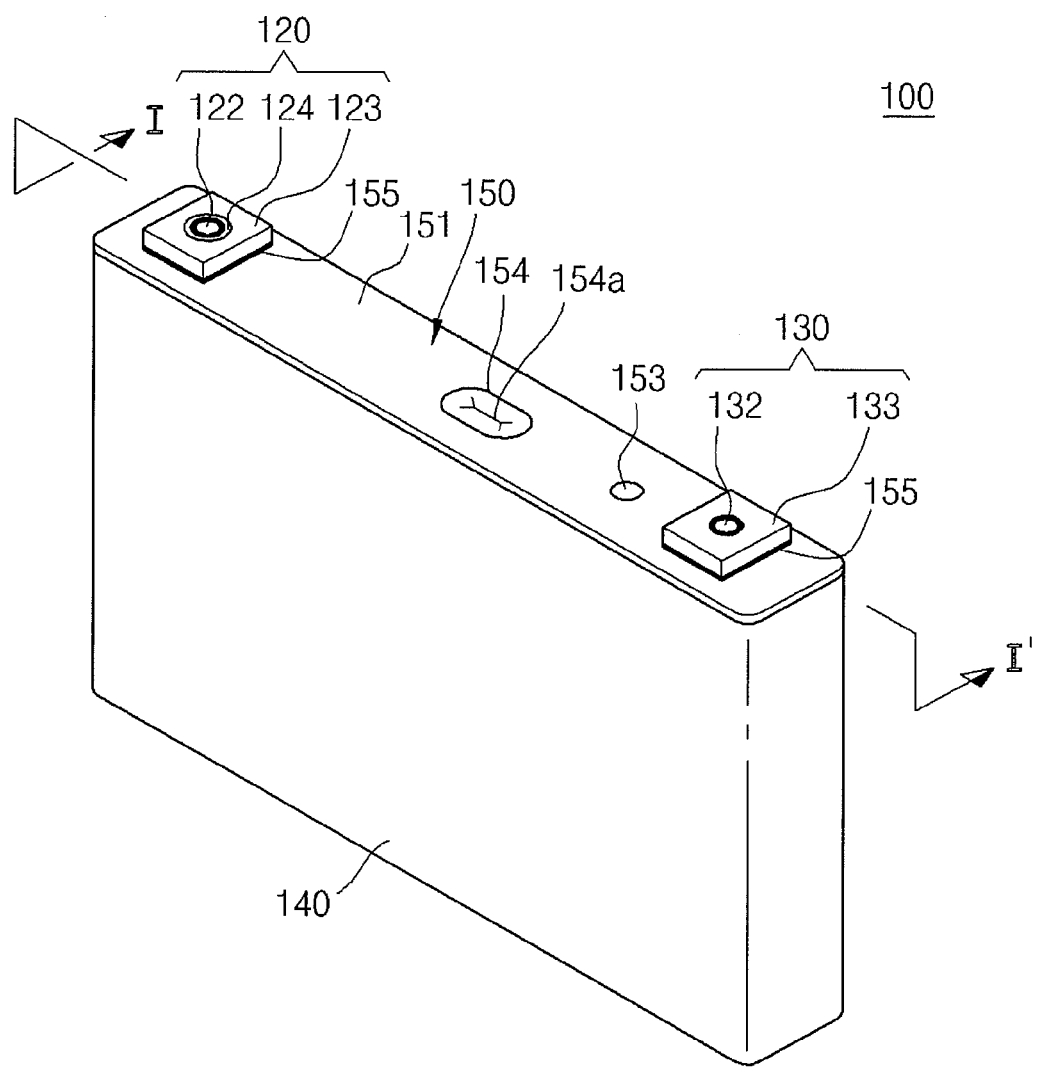
FIG. 1 illustrates a perspective view of a rechargeable battery according to an embodiment.
Figure 2:
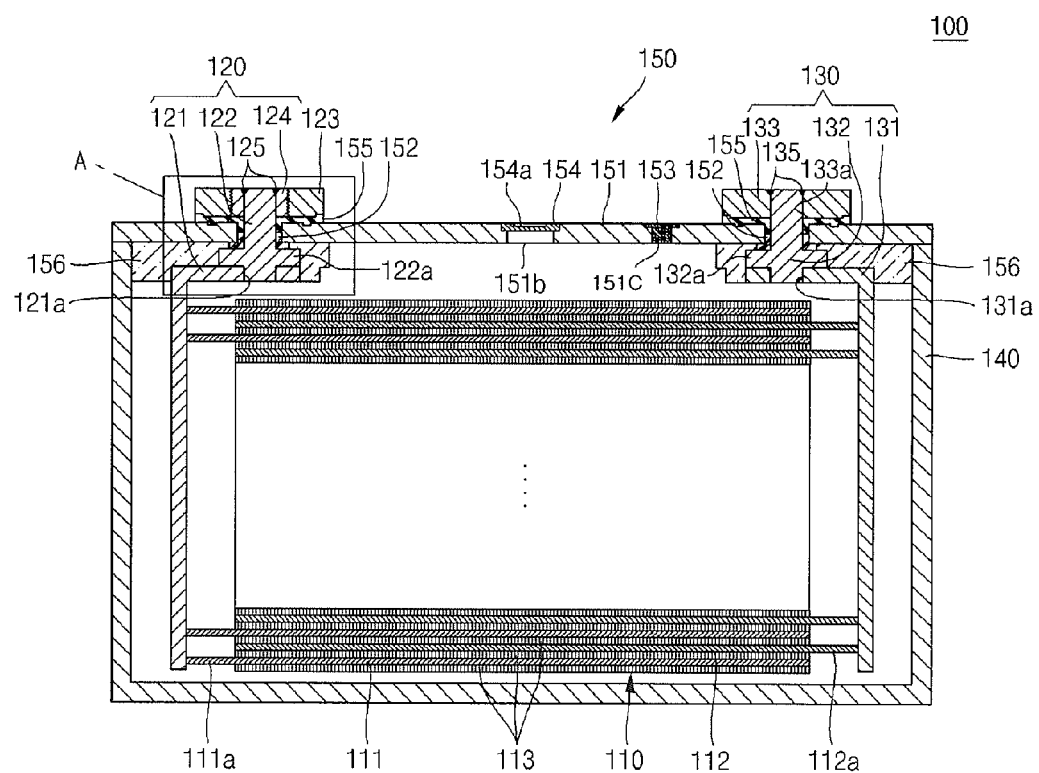
FIG. 2 illustrates a sectional view taken along line I-I' of FIG. 1.
Figure 3A:
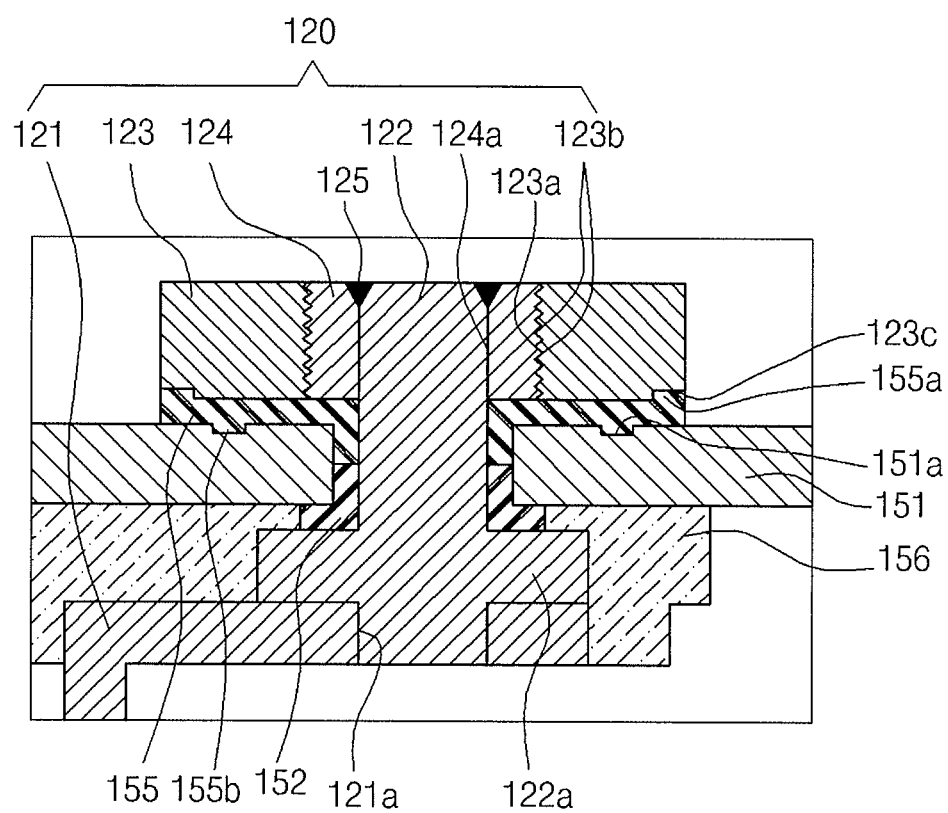
FIG. 3A illustrates an enlarged sectional view of a portion A of FIG. 2, and FIGS. 3B and 3C illustrate sectional views of alternate embodiments of the present invention.
Figure 3B:
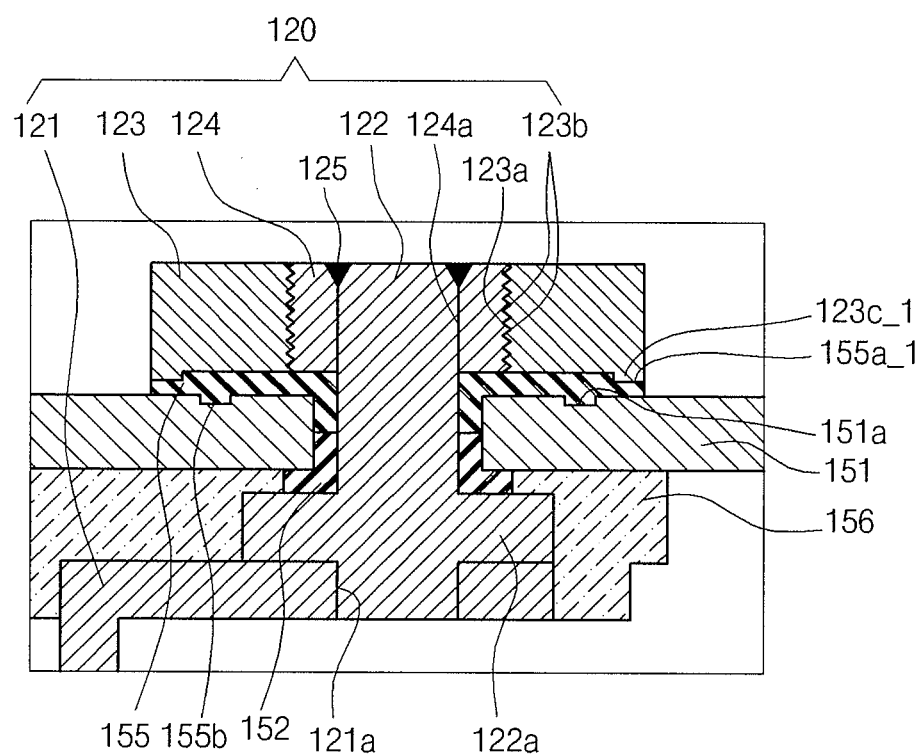
Figure 3C:
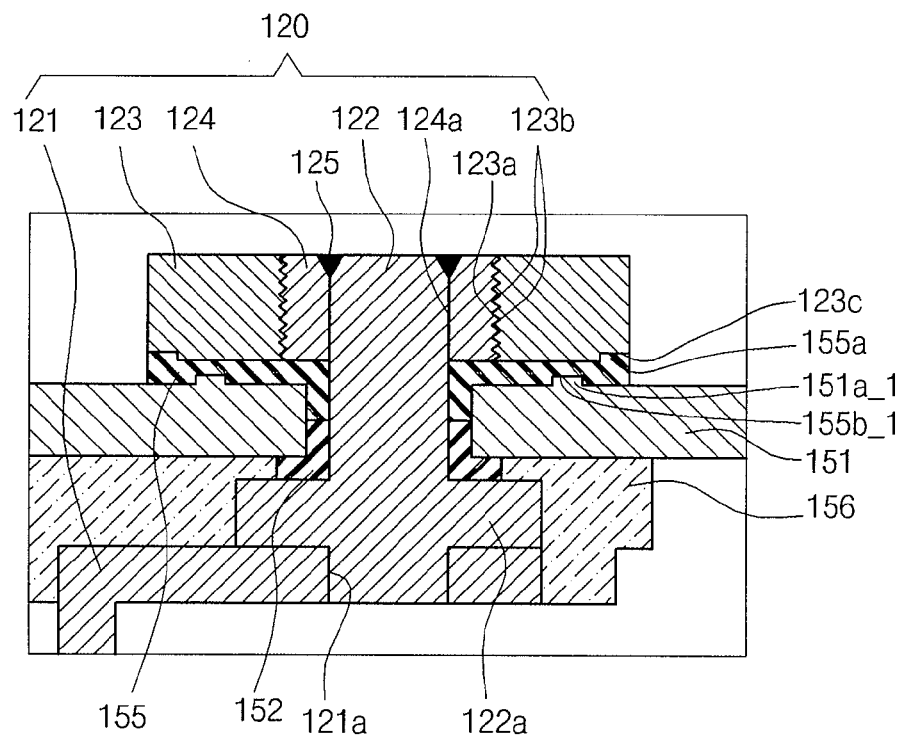

FIG. 1 illustrates a perspective view of a rechargeable battery according to an embodiment. FIG. 2 illustrates a sectional view taken along line I-I' of FIG. 1. FIG. 3A illustrates an enlarged sectional view of a portion A of FIG. 2, and FIGS. 3B and 3C illustrate enlarged sectional views of other embodiments of the present invention.

Referring to FIGS. 1 through 3, a rechargeable battery 100 according to an embodiment includes an electrode assembly 110, a first terminal 120, a second terminal 130, a case 140, and a cap assembly 150.

A thin plate- or film-shaped stack body of a first electrode plate 111, a separator 113, and a second electrode plate 112 is wound or overlapped to form the electrode assembly 110. Here, the first electrode plate 111 may serve as a negative plate, and the second electrode plate 112 may serve as a positive plate, and also vice versa.

A first electrode active material such as graphite or carbon is coated on a first electrode collector formed of a metal foil such as copper or nickel to manufacture the first electrode plate 111. The first electrode plate 111 includes a first electrode non-coating portion 111a on which a first active material is not coated. The first electrode non-coating portion 111a serves as a current flow passage between the first electrode plate 111 and the outside of the first electrode plate 111. However, an embodiment of the present invention is not limited to the material of the first electrode plate 111 described herein.

A second electrode active material such as transition-metal oxides is coated on a second electrode collector formed of a metal foil such as aluminum to manufacture the second electrode plate 112. The second electrode plate 112 including a second electrode non-coating portion 112a on which a second active material is not coated. The second electrode non-coating portion 112a serves as a current flow passage between the second electrode plate 112 and the outside of the second electrode plate 112. However, an embodiment of the present invention is not limited to the material of the second electrode plate 112 described herein.

The first and second electrode plates 111 and 112 may have polarities different from each other.

The separator 113 is located between the first electrode plate 111 and the second electrode plate 112 to prevent the first and second electrode plates 111 and 112 from being electrically short-circuited and to allow lithium ions to be moved between the first and second electrode plates 111 and 112. The separator 113 may be formed of polyethylene, polypropylene, or a combination thereof. However, an embodiment of the present invention is not limited to the material of the separator 113 described herein.

A first terminal 120 and a second terminal 130 respectively electrically connected to the first electrode plate 111 and the second electrode plate 112 are coupled to both ends of the electrode assembly 110.

The electrode assembly 110 together with electrolyte is received into the case 140. The electrolyte may be formed of a mixture of an organic solvent such as ethylene carbonate (EC), propylene carbonate (PC), dimethyl carbonate (DMC), ethylmethyl carbonate (EMC) and dimethyl carbonate (DEC), etc, and a lithium salt such as LiPF6, LiBF4, etc. Also, the electrolyte may be a solid, a liquid, a gel, or the like.

The first terminal 120 is formed of a metal and electrically connected to the first electrode plate 111. The first terminal 120 includes a first collector plate 121, a first terminal post 122, and a first terminal plate 123 including a conductor 124.

The first collector plate 121 contacts the first electrode non-coating portion 111a protruding from an end of a side of the electrode assembly 110. Substantially, the first collector plate 121 is welded to the first electrode non-coating portion 111a. The first collector plate 121 has an approximately Γ-shape or L-shape. A terminal hole 121a is defined in an upper portion of the first collector plate 121. The first terminal post 122 is inserted into the terminal hole 121a. For example, the first collector plate 121 may be formed of copper or copper alloy. However, an embodiment of the present invention is not limited to the material of the first collector plate 121.

The first terminal post 122 passes through a cap plate 151 (that will be described later) to protrude and extend upward by a certain length. Also, the first terminal post 122 is electrically connected to the first collector plate 121 at a lower portion of the cap plate 151. In addition, the first terminal post 122 protrudes and extends upward from the cap plate 151, and simultaneously, a flange 122a is located below the cap plate 151 to prevent the first terminal post 122 from being separated from the cap plate 151. A region of the first terminal post 122 corresponding to a lower side of the flange 122a is inserted into the first terminal hole 121a of the first collector plate 121. Here, the first terminal post 122 is electrically insulated from the cap plate 151. For example, the first terminal post 122 may be formed of copper or copper alloy. However, an embodiment of the present invention is not limited to the material of the first terminal post 122 described herein.

The first terminal plate 123 has a hole 123a. A conductor 124 having a certain thickness is located on an inner wall of the hole 123a. Also, the conductor 124 has a hole 124a having a certain diameter. Here, a surface 123b on the inner wall of the hole 123a of the first terminal plate 123 is roughened to improve a coupling force between the inner wall of the hole 123a of the first terminal plate 123 and the conductor 124. For example, the conductor 124 may be formed of copper or copper alloy, and the first terminal plate 123 may be formed of aluminum or aluminum alloy. However, an embodiment of the present invention is not limited to the materials of the first terminal plate 123 and the conductor 124. Furthermore, although described below, the conductor 124 may be manufactured using a plating process or a diffusion-welding process.

The first terminal plate 123 is coupled to the first terminal post 122. That is, the conductor 124 of the first terminal plate 123 is coupled to the first terminal post 122. Also, the first terminal post 122 and the conductor 124 are welded to each other. That is, boundary regions of the upwardly exposed first terminal post 122 and the conductor 124 are welded to each other. For example, a laser beam is applied to the boundary regions of the upwardly exposed first terminal post 122 and the conductor 124 to fuse the boundary regions. Then, the fused boundary regions are cooled to weld the boundary regions to each other. The weld region is indicated by a reference numeral 125 in FIG. 3.

As described above, since the first terminal post 122 is formed of copper or copper alloy and also the conductor 124 is formed of the copper or copper alloy, the first terminal post 122 and the conductor 124 may be easily welded to each other with superior weld quality. As described above, the first terminal plate 123 located on an outer circumference of the conductor 124 is formed of aluminum or aluminum alloy. Thus, a bus bar of the aluminum or aluminum alloy is easily welded to the first terminal plate 123.

The second terminal 130 is formed of a metal and electrically connected to the second electrode plate 112. The second terminal 130 includes a second collector plate 131, a second terminal post 132, and a second terminal plate 133.

The second collector plate 131 contacts the second electrode non-coating portion 112a protruding from an end of a side of the electrode assembly 110. The second collector plate 131 has an approximately ⌈-shape or L-shape. A terminal hole 131a is defined in an upper portion of the second collector plate 131. The second terminal post 132 is inserted into the terminal hole 131a. For example, the second collector plate 131 may be formed of aluminum or aluminum alloy. However, an embodiment of the present invention is not limited to the material of the second collector plate 131.

The second terminal post 132 passes through the cap plate 151 (that will be described later) to protrude and extend upward by a certain length. Also, the second terminal post 132 is electrically connected to the second collector plate 131 at a lower portion of the cap plate 151. That is, the second terminal post 132 protrudes and extends upward from the cap plate 151. Additionally, a flange 132a is located below the cap plate 151 to prevent the second terminal post 132 from being separated from the cap plate 151. A region of the second terminal post 132 corresponding to a lower side of the flange 132a is inserted into the second terminal hole 131a of the second collector plate 131. The second terminal post 132 is electrically insulated from the cap plate 151. For example, the second terminal post 132 may be formed of aluminum or aluminum alloy. However, an embodiment of the present invention is not limited to the material of the second terminal post 132.

The second terminal plate 133 has a hole 133a and is coupled to the second terminal post 132. In one embodiment, the second terminal post 132 is coupled to the hole 133a of the second terminal plate 133. Further, the second terminal post 132 and the second terminal plate 133 are welded to each other. That is, boundary regions of the upwardly exposed second terminal post 132 and the second terminal plate 133 are welded to each other. For example, a laser beam is applied to the boundary regions of the upwardly exposed second terminal post 132 and the second terminal plate 133 to fuse the boundary regions. Then, the fused boundary regions are cooled to weld the boundary regions to each other.

As described above, since the second terminal post 132 is formed of aluminum or aluminum alloy and also the second terminal plate 133 is formed of aluminum or aluminum alloy, the second terminal post 132 and the second terminal plate 133 may be easily welded to each other with superior weld quality. However, an embodiment of the present invention is not limited to the materials of the second terminal post 132 and the second terminal plate 133.

Furthermore, a bus bar of aluminum or aluminum alloy is easily welded to the second terminal plate 133. Here, the second terminal plate 133 may be electrically connected to the cap plate 151. Thus, the cap plate 151 and the case 140 may have the same polarity (e.g., a positive pole) as that of the second terminal 130.

As described above, since the second collector plate 131, the second terminal post 132, and the second terminal plate 133 which constitute the second terminal 130 are formed of aluminum or aluminum alloy, the conductor formed of copper or copper material of the first terminal 120 is not required.

The case 140 is formed of a conductive metal such as aluminum, aluminum alloy, or nickel-plated steel. The case has a hexagonal shape having an opening on which the electrode assembly 110, the first terminal 120, and the second terminal 130 are seated. Further, an inner surface of the case 140 may be insulation-treated to insulate the case from the electrode assembly 110, the first terminal 120, the second terminal 130, and the cap assembly 150.

The cap assembly 150 is coupled to the case 140. In particular, the cap assembly 150 includes the cap plate 151, a seal gasket 152, a plug 153, a safety vent 154, an upper insulating member 155, and a lower insulating member 156.

The cap plate 151 seals the opening of the case 140. The cap plate 151 may be formed of the same material as the case 140. For example, the cap plate 151 may be coupled to the case 140 using a laser weld process. As described above, since the cap plate 151 has the same polarity as that of the second terminal 130, the cap plate 151 may have the same polarity as that of the case 140.

The seal gasket 152 is formed of an insulating material and is located between each of the first and second terminal posts 122 and 132 and the cap plate 151 to seal a space between each of the first and second terminal posts 122 and 132, respectively, and the cap plate 151. The seal gasket may prevent external moisture permeating the rechargeable battery 100 or may prevent the electrolyte in the rechargeable battery 100 from leaking to the outside.

The plug 153 seals an electrolyte injection hole 151c of the cap plate 151. The safety vent 154 is on a vent hole 151b of the cap plate 151. Also, the safety vent 154 includes a notch 154a configured to open the safety vent 154 at a preset pressure.

The upper insulating member 155 is located between each of the first and second terminal posts 122 and 132, respectively, and the cap plate 151. Also, the upper insulating member 155 is closely attached to the cap plate 151. Furthermore, the upper insulating member 155 may be closely attached to the seal gasket 152. The upper insulating member 155 insulates the first and second terminal posts 122 and 132 from the cap plate 151.

The lower insulating member 156 is located between each of the first and second collector plates 121 and 131, respectively, and the cap plate 151 to prevent the first and second collector plates 121 and 131 from being unnecessarily short-circuited to the cap plate 151. That is, the lower insulating member 156 prevents the first collector plate 121 from being short-circuited to the cap plate 151 and the second collector plate 131 from being short-circuited to the cap plate 151.

Figure 4A:
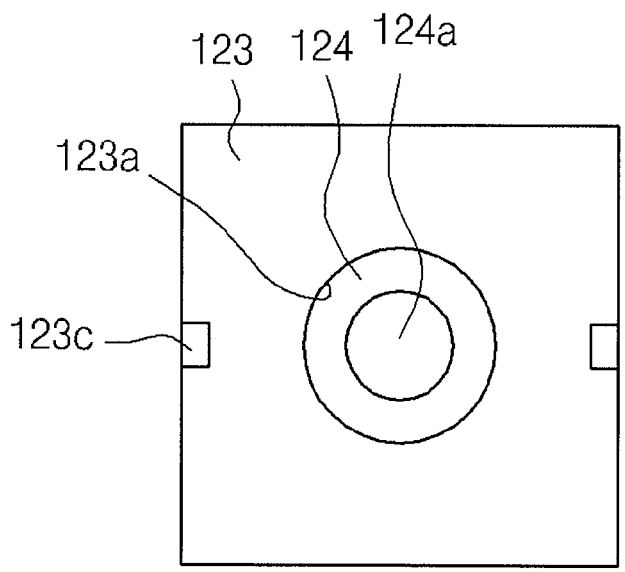
FIG. 4A illustrates a bottom view of a terminal plate of a rechargeable battery according to an embodiment.
Figure 4B:
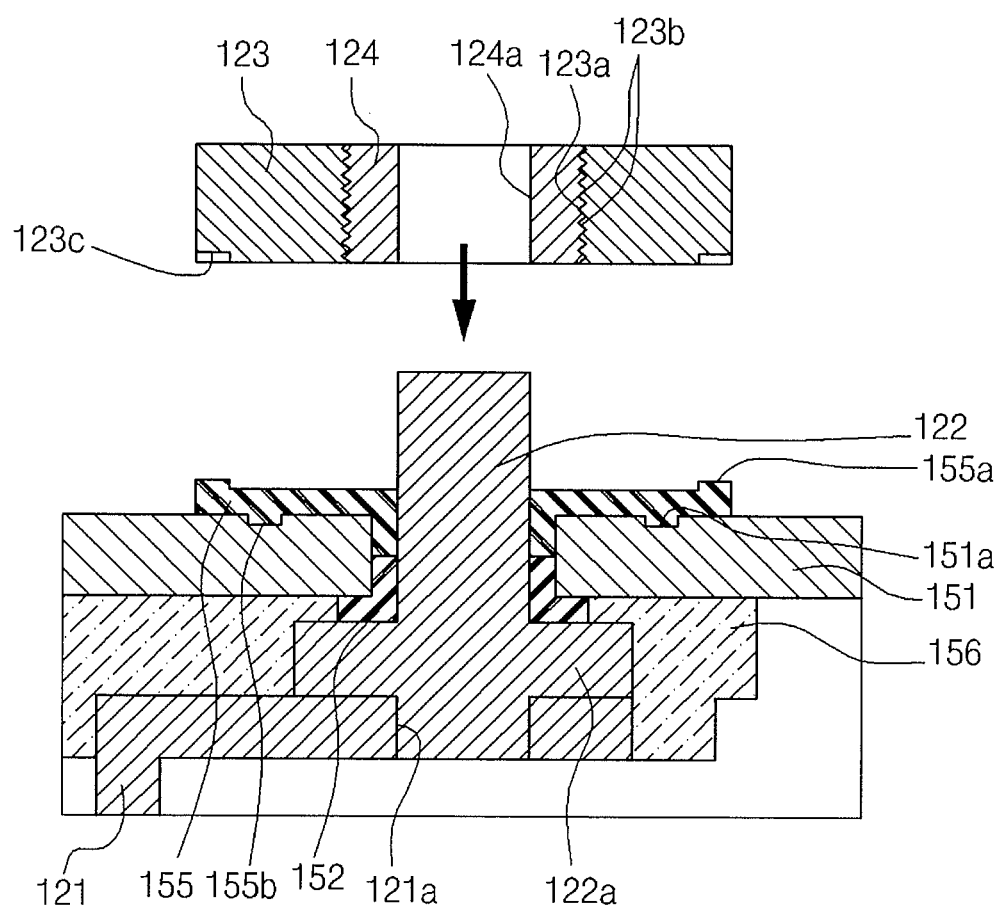
FIGS. 4B and 4C illustrate sectional views of a method of coupling a terminal plate to a terminal post.
Figure 4C:
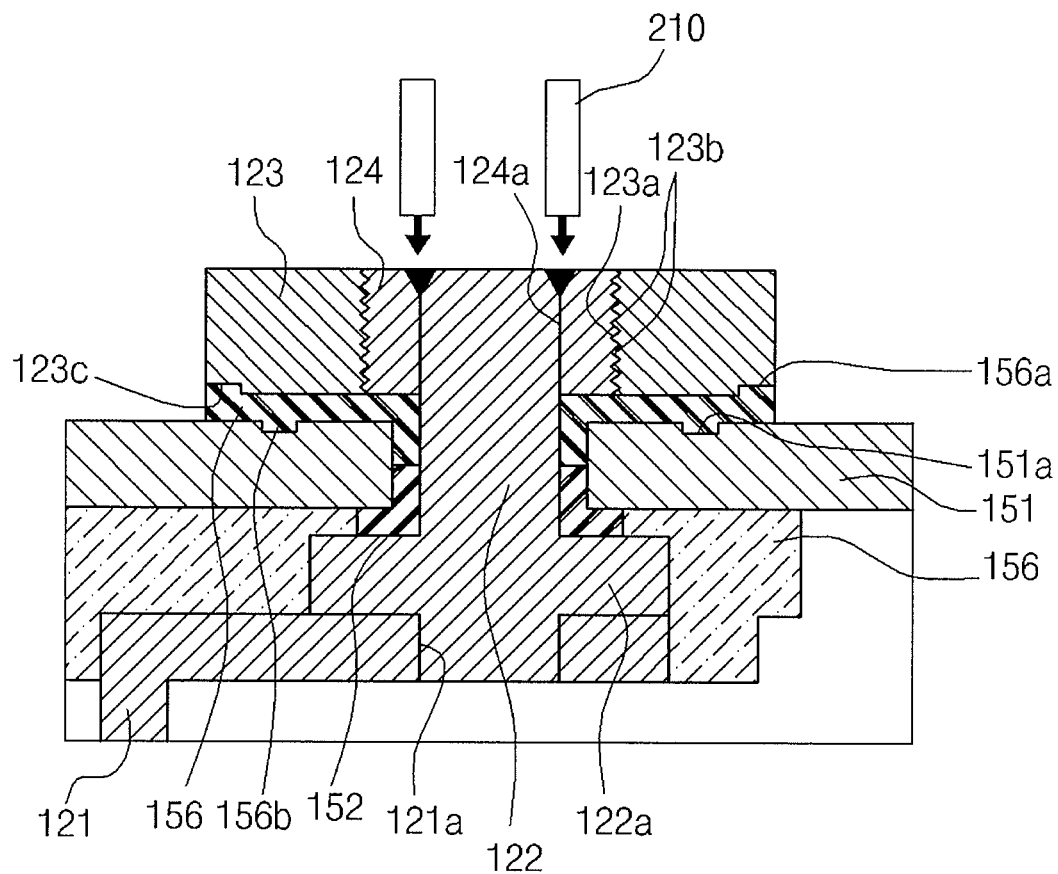

FIG. 4A illustrates a bottom view of a terminal plate of a rechargeable battery according to an embodiment, and FIGS. 4B and 4C illustrate sectional views of a method of coupling a terminal plate to a terminal post.

Referring to FIG. 4A, a first terminal plate 123 has an approximately square shape in plan view, and a hole 123a having an approximately circular shape is defined in a center thereof. Also, a conductor 124 having a certain thickness is disposed on an inner wall of the hole 123a. The conductor 124 has a hole 124a having an approximately circular shape. A first terminal post 122 is coupled to the hole 124a. Here, the first terminal plate 123 is formed of aluminum or aluminum alloy, and the conductor 124 is formed of copper or copper alloy. Also, the first terminal post 122 (see FIG. 4B) is formed of copper or copper alloy. Thus, the conductor 124 and the first terminal post 122 may be welded to each other. Here, a concave groove 123c is defined in a side of the first terminal plate 123. A protrusion 155a (that will be described below) of an upper insulating member 155 is coupled to the concave groove 123c. In contrast, as shown in FIG. 3B, a protrusion 123c_1 may be defined in a side of the first terminal plate 123, and a concave groove 155a_1c of an upper insulating member 155 may be coupled to the protrusion 123c_1.

Referring to FIG. 4B, the first terminal post 122 is coupled to a wall defining the hole 124a of the conductor 124 on the first terminal plate 123. Also, the first terminal plate 123 and the conductor 124 are seated on the upper insulating member 155 approximately surrounding the first terminal post 122 and extending along a top surface of a cap plate 151 by a certain length. Here, the protrusion 155a is located on a top surface of the upper insulating member 155. The protrusion 155a is coupled to the concave groove 123c defined in the first terminal plate 123. Thus, the first terminal plate 123 is not rotatable on the upper insulating member 155. Furthermore, a protrusion 155b having a certain thickness is located on a bottom surface of the upper insulating member 155. The protrusion 155b is coupled to a concave groove 151a defined in the cap plate 151. Thus, the upper insulating member 155 is not rotatable on the cap plate 151. In contrast, as shown in FIG. 3C, a concave groove 155b_1 having a certain depth may be disposed on a bottom surface of the upper insulating member 155. A protrusion 151a_1 of cap plate 151 may be coupled to a concave groove 155b_1a defined in the upper insulating member 155.

Referring to FIG. 4C, the first terminal post 122 and the conductor 124 are welded to each other. For example, a laser beam using a laser welding tool 210 is applied to boundary regions of the first terminal post 122 and the conductor 124 to fuse the first terminal post 122 and the conductor 124 together. Thereafter, when the supply of the laser beam is stopped, the fused portions are cooled to weld the first terminal post 122 and the conductor 124 to each other.

As described above, since the conductor 124 formed of copper or copper alloy is located on the first terminal plate 123 formed of aluminum or aluminum alloy using a plating process or a diffusion-welding process, the first terminal post 122 formed of copper or copper alloy may be welded to the conductor 124 formed of copper or copper alloy. Furthermore, a bus bar of aluminum or aluminum alloy may be welded to the first terminal plate 123 formed of aluminum or aluminum alloy.

Figure 5A:
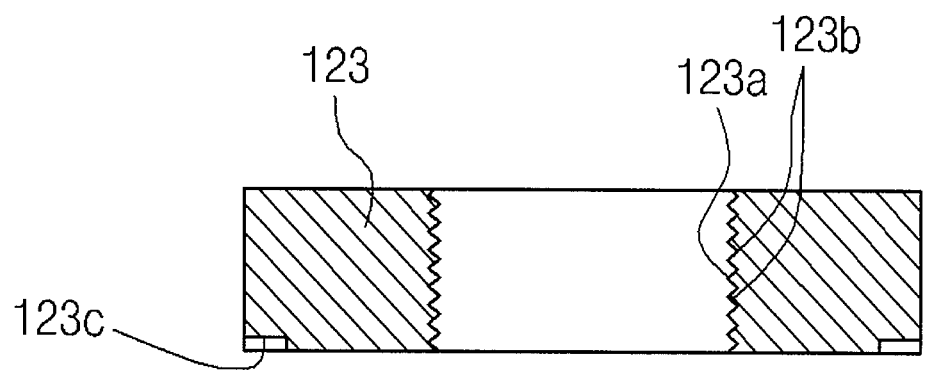
FIGS. 5A through 5C illustrate views of a method of manufacturing a terminal plate of a rechargeable battery according to an embodiment.
Figure 5B:
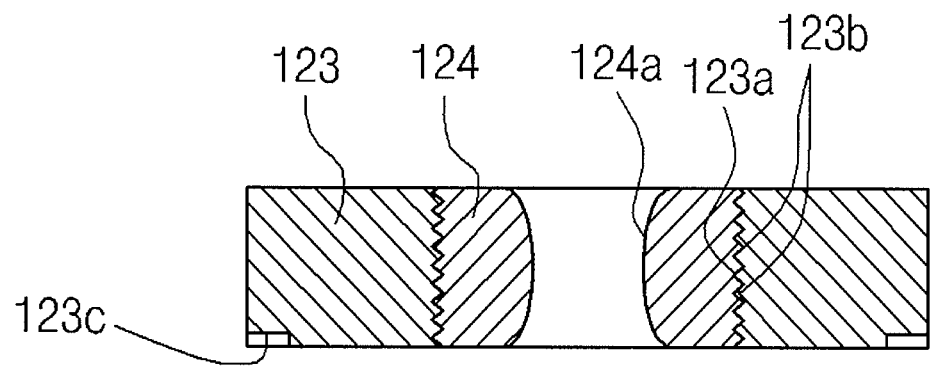
Figure 5C:
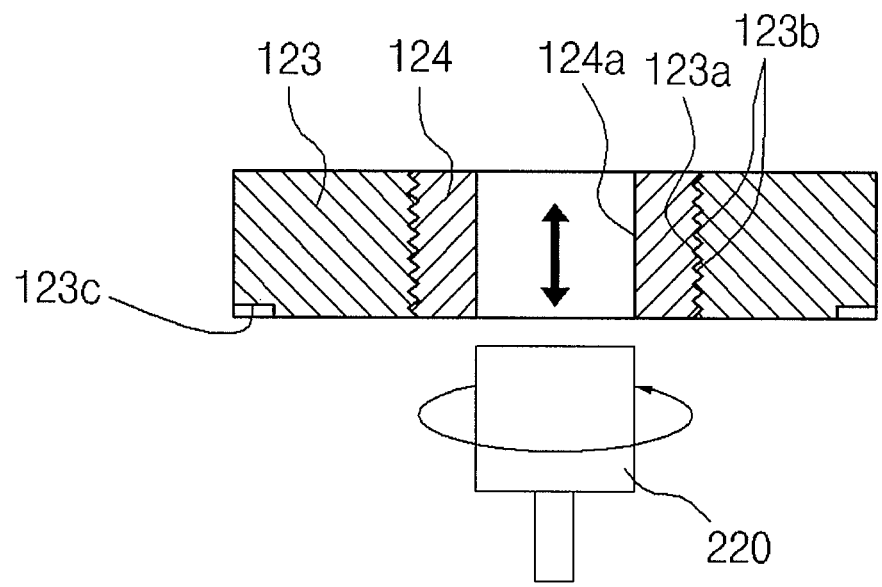

FIGS. 5A through 5C illustrate views of a method of manufacturing a terminal plate of a rechargeable battery according to an embodiment.

Referring to FIG. 5A, a hole 123a is formed in a first terminal plate 123. Also, an inner wall 123b defining the hole 123a is roughened to improve a coupling strength of the terminal plate to another structure. Here, the first terminal plate 123 may be formed of aluminum or aluminum alloy. However, an embodiment of the present invention is not limited to the material of the first terminal plate 123 described herein.

Referring to FIG. 5B, a conductor 124 having a certain thickness is formed on the inner wall of the hole 123a of the first terminal plate 123. For example, the conductor 124 having the certain thickness may be formed on the inner wall of the hole 123a of the first terminal plate 123 using an electrolyte plating process. In detail, a positive voltage is applied to the first terminal plate 123, and a negative voltage is applied to a plating solution. In this state, the first terminal plate 123 is immersed into the plating solution. Here, the plating solution may include one of any materials such as copper sulfate, copper fluoroborate, copper sulfamate, copper cyanide, pyrophosphate copper, or an equivalent. However, an embodiment of the present invention is not limited to the plating solutions described herein. Furthermore, the plating process is performed when the conductor 124 has a thickness of about 1 mm or more. Here, the thickness of the conductor 124 represents a thickness defined toward a center thereof from the inner wall of the hole 123a of the first terminal plate 123. When the conductor 124 has a thickness less than about 1 mm, it is difficult to weld the first terminal post 122 (see FIG. 4C) to the conductor 124. In other words, if the thickness is too small, a sufficient welding region is not secured between the first terminal post 122 and the conductor 124.

Also, during the plating process, an insulator is formed on a remaining surface except the inner wall defining the hole 123a of the first terminal plate 123. Thus, the conductor 124 is not formed on the remaining surface except the inner wall defining the hole 123a.

Furthermore, the conductor 124 has a relatively thick thickness in a central region formed by the plating process. Thus, the relatively thick region may be removed.

Referring to FIG. 5C, a grinding tool 220 that rotates at high speed is coupled to a hole 124a of the conductor 124. As a result, the relatively thick region of the conductor 124 is ground and removed. Thus, the conductor 124 has a substantially uniform thickness. That is, the hole 124a of the conductor 124 has a uniform diameter.

Therefore, the first terminal plate 123 formed of aluminum or aluminum alloy includes the conductor 124 formed of copper or copper alloy. Furthermore, since the conductor 124 formed of copper or copper alloy is formed on the first terminal plate 123 through the plating process, a coupling strength between the conductor 124 and the first terminal plate 123 is improved. Thus, when the rechargeable battery is used for a long time, the conductor 124 is not separated from the first terminal plate 123.

Figure 6A:
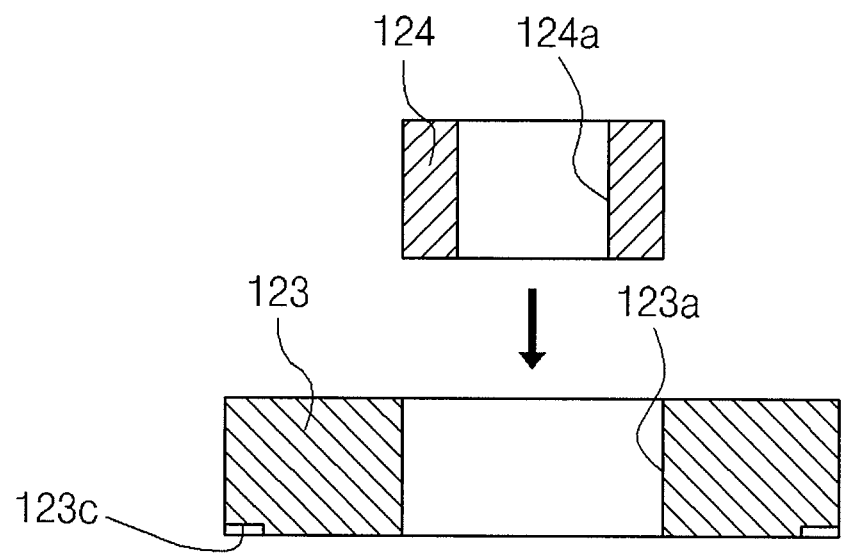
FIGS. 6A and 6B illustrate views of a method of manufacturing a terminal plate of a rechargeable battery according to another embodiment.
Figure 6B:
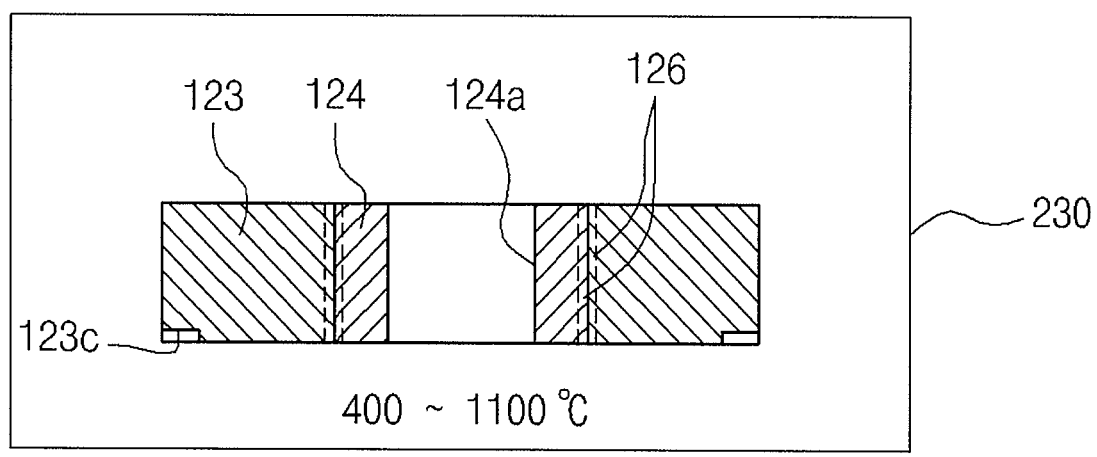

FIGS. 6A and 6B illustrate views of a method of manufacturing a terminal plate of a rechargeable battery according to another embodiment.

Referring to FIG. 6A, a first terminal plate 123 having a hole 123a and a conductor 124 having a hole 124a are prepared. The conductor 124 is coupled to the hole 123a of the first terminal plate 123. The hole 123a of the first terminal plate 123 has a diameter substantially equal to an outer diameter of the conductor 124.

As shown in FIG. 6B, the first terminal plate 123 and the conductor 124, which are coupled to each other are placed into a furnace 230. Then, a temperature within the furnace 230 is gradually increased to reach a temperature of about 400° C. to about 1,100° C. As a result, the first terminal plate 123 formed of aluminum or aluminum alloy and the conductor 124 formed of copper or copper alloy are fused to each other. Thus, the first terminal plate 123 and the conductor 124 are coupled to each other, and in one embodiment, the first terminal plate 123 and the conductor 124 are mutually welded to each other. Sequentially, the temperature within the furnace 230 is gradually cooled to room temperature to prevent internal stress from occurring within the first terminal plate 123 and the conductor 124. Here, an intermetallic layer 126 is formed between the first terminal plate 123 and the conductor 124 by the diffusion-welding process.

The welding strength between the first terminal plate 123 and the conductor 124 may be improved by the diffusion-welding process. Thus, separate plating equipment and grinding equipment are not required. Furthermore, since the diffusion-welding process is performed to form the intermetallic layer 126 between the first terminal plate 123 and the conductor 124, the welding strength between the first terminal plate 123 and the conductor 124 may be improved.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

DESCRIPTION OF THE REFERENCE NUMERALS IN THE DRAWINGS

| | |
|---|---|
| 100: Rechargeable battery | 110: Electrode assembly |
| 120: First terminal | 121: First collector plate |
| 122: First terminal post | 123: First terminal plate |
| 124: Conductor | |
| 130: Second terminal | 131: Second collector plate |
| 132: Second terminal post | 133: Second terminal plate |
| 140: Case | |
| 150: Cap assembly | 151: Cap plate |
| 152: Seal gasket | 153: Plug |
| 154: Safety vent | 155: Upper insulating member |
| 156: Lower insulating member | |

What is claimed is:

1. A rechargeable battery comprising:
a case;
a cap plate on the case;
a terminal post protruding from the cap plate;
a terminal plate coupled to the terminal post, wherein the terminal plate comprises:
a body having an opening extending entirely through the body; and
a conductor within the opening and welded to the body, and being between the terminal post and the body of the terminal plate, wherein the conductor contacts and surrounds an outermost perimeter of the terminal post, wherein the conductor and the terminal post comprise the same material and wherein the conductor and the terminal plate comprise different materials; and
an insulating member directly contacting the terminal, the conductor and the cap plate.

2. The secondary battery of claim 1, wherein the conductor and the terminal post comprise copper or a copper alloy.

3. The secondary battery of claim 1, wherein the terminal plate comprises aluminum or an aluminum alloy.

4. The secondary battery of claim 1, wherein one of the terminal plate or the insulating member has a groove configured to receive a protrusion on the other of the insulating member or the terminal plate.

5. The secondary battery of claim 1, wherein one of the cap plate or the insulating member has a groove adapted to receive a protrusion on the other of the insulating member or the cap plate.

6. The secondary battery of claim 1, wherein a side wall of the terminal plate that contacts the conductor has a roughened texture.

7. The secondary battery of claim 1, wherein the conductor and the first terminal plate are diffusion welded together.

8. The secondary battery of claim 1, wherein the conductor and the terminal post are welded together.

9. The secondary battery of claim 1, wherein the conductor and the terminal post are laser welded together.

10. The secondary battery of claim 9, wherein a boundary region of the terminal post and the conductor are welded to each other.

11. The secondary battery of claim 1, further comprising a second terminal comprising a second terminal post protruding from the cap plate and a second terminal plate coupled to the second terminal.

12. The secondary battery of claim 11, wherein the second terminal post and the second terminal plate comprise the same material.

13. The secondary battery of claim 1, wherein the conductor comprises a plated conductive material.

14. The secondary battery of claim 1, wherein a thickness of the conductor is more than about 1 mm.

* * * * *